United States Patent [19]

Schwartz et al.

[11] 3,894,919

[45] July 15, 1975

[54] CONTACTING SEMICONDUCTORS DURING ELECTROLYTIC OXIDATION

[75] Inventors: Bertram Schwartz, Westfield; Stuart Marshall Spitzer, Berkeley Heights; Gregory Dyett Weigle, Green Brook, all of N.J.

[73] Assignee: Bell Telephone Laboratories, Incorporated, Murray Hill, N.J.

[22] Filed: May 9, 1974

[21] Appl. No.: 468,424

[52] U.S. Cl. .................................. 204/15; 204/56 R
[51] Int. Cl.[2] ...................... C25D 11/00; C25D 5/02
[58] Field of Search ............................ 204/15, 56 R

[56] References Cited

UNITED STATES PATENTS

| | | | |
|---|---|---|---|
| 3,351,825 | 11/1967 | Vidas | 317/234 |
| 3,759,798 | 9/1973 | Graff et al. | 204/38 A |
| 3,764,491 | 10/1973 | Schwartz | 204/56 R |
| 3,798,135 | 3/1974 | Bracken et al. | 204/15 |
| 3,798,139 | 3/1974 | Schwartz | 204/56 R |

*Primary Examiner*—T. M. Tufariello
*Attorney, Agent, or Firm*—L. H. Birnbaum

[57] ABSTRACT

A method is described which permits electrolytic oxidation of semiconductor samples with contact metallization in place. An anodizable metal such as Al, Ni, Ta, Ti, Zn or alloys including such metal is deposited over the contacts. During electrolytic oxidation, the oxide formed over the metal closes off shunting paths which would normally exist through the contacts and thereby permits a native oxide to grow into the exposed surface of the semiconductor. The oxide formed over the metal can be easily cracked under mechanical pressure to permit electrical connection to the contacts in the final device.

12 Claims, 5 Drawing Figures

CONTACTING SEMICONDUCTORS DURING ELECTROLYTIC OXIDATION

BACKGROUND OF THE INVENTION

This invention relates to a method of electrolytically oxidizing III–V compound semiconductor samples with metal contacts on the surface.

It has recently been disclosed that an amorphous native oxide can be grown into the surface of a III—V semiconductor by means of electrolytic systems (see U.S. patent application of B. Schwartz, Ser. No. 292,127, filed Sept. 25, 1972, now U.S. Pat. No. 3,798,139). The oxide has a wide variety of uses in III—V semiconductor device fabrication such as passivation, masking and providing contact insulation. In many processes, such as fabrication of light-emitting diodes, lasers, field effect transistors and IMPATT devices, it is often desirable to oxidize the semiconductor surface subsequent to the formation of contact metallization thereon, whether on the front or back surface of the device (where the front surface is understood to be the surface on which device processing is done and the back surface is the substrate side of a device). However, contacts on the sample provide low resistance electrical paths between the semiconductor and electrolyte during electrolytic oxidation thereby shunting the current flow needed to form the oxide on the exposed surface.

One solution to this problem is to cover the contacts with a photoresist layer which prevents current flow through the contacts during electrolytic oxidation. (See U.S. patent application of Ermanis-Schwartz Ser. No. 440,657, filed Feb. 8, 1974). This approach is not entirely satisfactory for all processes since the photoresist tends to dissolve after a few minutes in certain electrolytes. The present invention offers an alternative to this technique.

SUMMARY OF THE INVENTION

In accordance with the invention, prior to oxidation the contacts are covered by a metal such as Al, Ni, Ti, Ta, Zn or alloys including such metals which can be oxidized in a suitable electrolytic system. The metal can be confined only to the area of the contacts on the front surface or may extend over the entirety of the back surface of the semiconductor. During oxidation, the metal oxide formed closes off the current paths through the contacts permitting a native oxide to grow on the exposed areas of the semiconductor. This metal oxide can later be cracked or otherwise penetrated to permit electrical connection to the contacts.

BRIEF DESCRIPTION OF THE DRAWING

These and other features of the invention will be delineated in detail in the description to follow. In the drawing.

DETAILED DESCRIPTION OF THE INVENTION

One embodiment of the invention will be described in reference to FIGS. 1A–1C and FIG. 2. The starting material was a wafer of GaAs, a portion of which is shown as 10 in FIG. 1A. The material was of n-type conductivity, doped with silicon to a concentration of approximately $5 \times 10^{17}$ $cm^{-3}$. On the 100 surface of the semiconductor an array of gold contacts such as 11 was deposited by standard techniques. This array may be thought of, for example, as a distributed dot contact used on the back surface of many light-emitting diodes. It is desired in this embodiment to form a native oxide on the front surface, 23, of the wafer by electrolytic means. This cannot readily be done with the structure of FIG. 1A since, as mentioned previously, any current supplied to the structure during electrolytic oxidation will be shunted through the contacts.

Figure 1A:
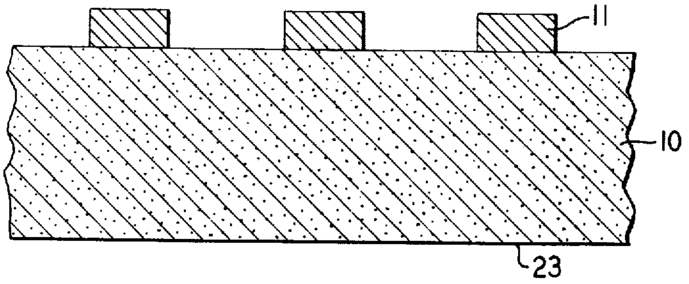
FIGS. 1A–1C are cross-sectional views of a portion of a semiconductor wafer during different stages of manufacture in accordance with one embodiment of the invention.
Figure 1B:
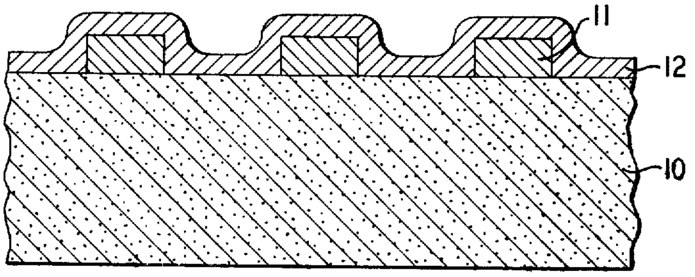
Figure 1C:
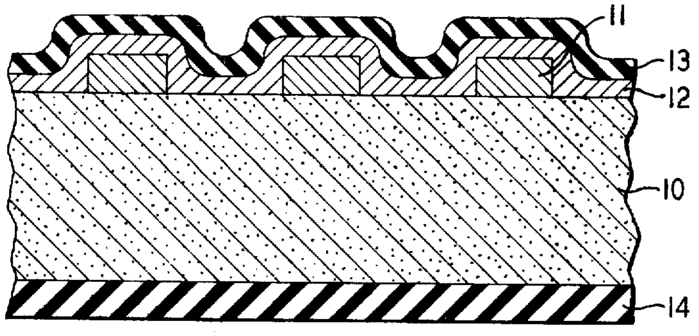

Thus, in accordance with one feature of the invention, as shown in FIG. 1B, a layer, 12, of an oxidizable metal, in this case aluminum, was deposited on the back surface over the gold contacts. The metal layer was deposited by hot filament evaporation but any of the techniques well known in the art should be suitable. The thickness of the aluminum layer was approximately 2,000 A.

Figure 2:
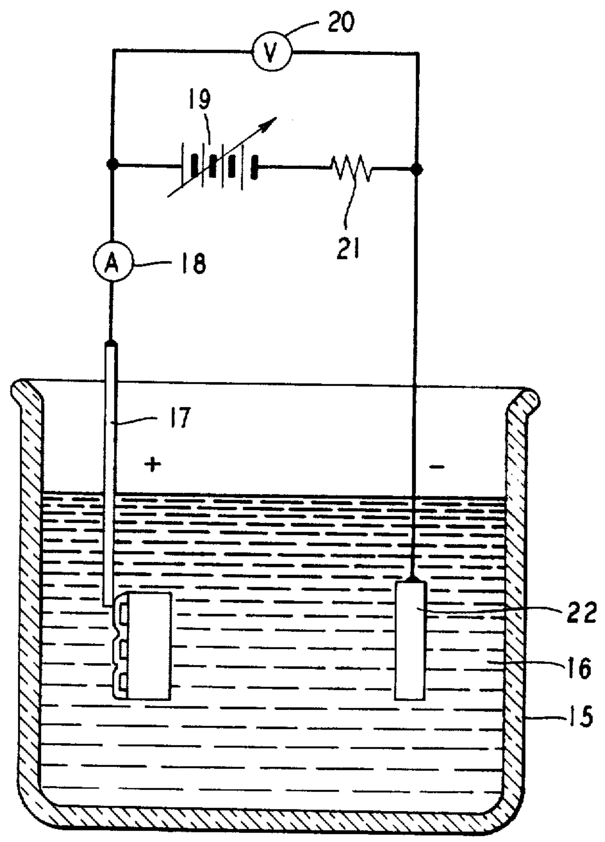
FIG. 2 is a schematic illustration of an electrolytic oxidation system which may be utilized in accordance with the same embodiment.

Oxidation was then accomplished utilizing the system illustrated in FIG. 2. The liquid electrolyte, 16, was confined within an ordinary container, 15. In this embodiment the electrolyte was a 30 percent aqueous solution of $H_2O_2$ with a pH adjusted to approximately 2.5 by $H_3PO_4$. The wafer was attached on the back surface to an anodizable wire, 17, in this case Al, by means of wax, and immersed in the electrolyte along with an electrode which in this case was platinum but could be carbon or one of the other noble metals. These samples were electrically coupled to an adjustable d.c. voltage source 19 and a current limiting resistor 21 which together represent a constant voltage source. It will be readily appreciated that a constant current source could also be utilized. The semiconductor was made the anode and the platinum electrode was made the cathode of the system. An ammeter 18 and voltmeter 20 were included in the system for monitoring current and voltage respectively.

With the semiconductor immersed in the electrolyte, a potential of approximately 100 volts was supplied across the electrodes for approximately 5 minutes. A monitoring of the current showed the current through the system decreased as a function of time to an asymtotic limit of approximately a few milliamps. This showed that a native oxide had grown into the exposed surfaces of the semiconductor in accordance with prior teachings (see application of Schwartz, Supra). When the structure was removed, it was confirmed that a native oxide, 14 of FIG. 1C, had indeed been grown into the exposed surface while a layer of $Al_2O_3$, 13, of approximately 1500 A had been formed on the aluminum layer 12 to close off current paths through the contacts.

The aluminum oxide layer formed during oxidation was found to be sufficiently thin and brittle so that a sharp probe or ultrasonic bonding technique could crack the oxide and permit electrical contact to the underlying gold for device operation. The unconsumed aluminum over the contacts can remain in place since Al is itself a good conducting material. For most applications, including a distributed dot contact, the unconsumed Al between the contacts can also be left in place, since only the gold will make ohmic contact to the semiconductor. For devices where it is desired to isolate the gold contacts, however, the Al can be easily removed by, for example, a dilute solution of HF which does not affect the native oxide.

It will be clear to those skilled in the art that the invention is not limited to the specific electrolyte described. It is known, in general, that a native oxide can be grown electrolytically on a III—V semiconductor employing an electrolyte comprising an $H_2O_2$ solution with or without a pH modifier, or an electrolyte of water alone with an amount of a pH modifier to adjust the pH within the range 1–5 or 9–13. It is also known that water in the pH range 5–9 may be employed if it includes a source of ions, such as an ammonium acid phosphate, which provide conductivity to the solution. (See U.S. patent application of F. Ermanis and B. Schwartz, Ser. No. 440,657 filed Feb. 18, 1974). It is known or predicted that these electrolytes will also oxidize aluminum (see U.S. patent application of B. Schwartz-S. M. Spitzer and G. D. Weigle Ser. No. 468,423 filed on an even date herewith).

The inventive method should be applicable to all III—V compound semiconductors which form a native oxide by use of these electrolytic systems. Examples of useful semiconductors in addition to GaAs, are GaP, GaAsP, GaAlAs, GaAlP, InGaAs, InGaP and mixtures thereof.

It will also be appreciated that the inventive method is not limited to the use of aluminum as the oxidizable metal. It has been shown, for example, that Ni, Ta, Ti, and Zn are oxidizable in a water electrolyte and may be utilized in place of Al in accordance with the invention. In general, the method should be considered applicable to any metal which is oxidizable in the electrolyte employed.

It is desirable in this process to form a thin metal oxide which can be easily penetrated for contact purposes. Thus, the metal layer should preferably be thick enough so that the entire layer over the contact is not consumed during oxidation. The aluminum layer is consumed during oxidation at the rate of approximately 10 A per volt of potential applied to the system. The preferred range of applied potential is approximately 5–175 volts. Therefore, for the preferred upper limit of potential, the metal layer should be at least 1,750 A. In commercial manufacture, a minimum thickness of approximately 2,000 A would be desirable for uniform and adherent coverage of the contact layers. Also, in cases where the layer will be shaped as for example by photolithography or deposition through a metal mask, a maximum thickness of approximately 7,000 A is desired. The oxidation rates of other metals mentioned above are approximately the same as that of aluminum and the same ranges therefore apply.

It will also be understood that the metal layer may be restricted to the area of the contacts rather than deposited over the entire surface. The former would be called for when it is desired to form an oxide selectively on the front surface of a semiconductor sample which also included the contact metallization, e.g., in the fabrication of light-emitting diodes, lasers, field effect transistors and IMPATT devices.

Figure 3:
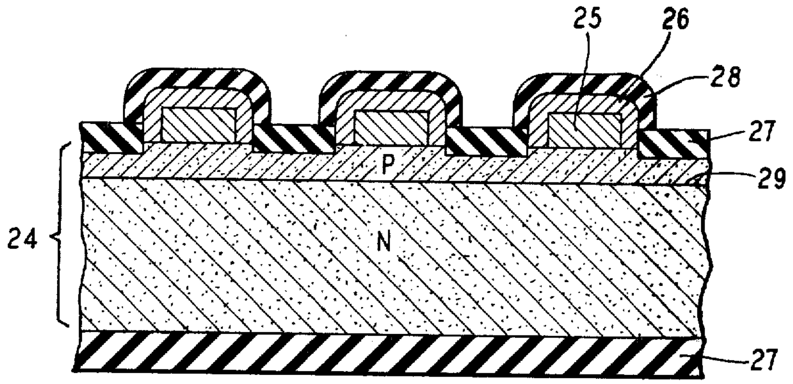
FIG. 3 is a cross-sectional view of a portion of a semiconductor wafer during one stage of manufacture in accordance with a further embodiment of the invention.

FIG. 3 illustrates this embodiment. Upon the front surface of a III—V semiconductor wafer, 24, such as GaP, which includes a p-n junction 29, there are formed metal contacts such as 25. These contacts may be thought of, for example, as a portion of the metallization defining an alpha-numeric array. The oxidizable metal, 26, such as aluminum, is deposited over the contacts 25 leaving portions of the front surface exposed. When the structure is oxidized electrolytically as before, a native oxide, 27, grows into the exposed front and back surfaces of the semiconductor, while an oxide, 28, is also formed over the metal 26 to close off shunt paths. Again, the metal oxide layer can be penetrated to make electrical connection to the contact metal. It will be appreciated that FIG. 3 is somewhat idealized in showing sharp boundaries between oxides 27 and 28. In actual practice, the boundary is graded.

Various additional modifications will become apparent to those skilled in the art. All such variations which basically rely on the teachings through which the invention has advanced the art are properly considered within the spirit and scope of the invention.

What is claimed is:

1. A method of forming an oxide on the surface of a III—V compound semiconductor including contact metallization of a first conducting material on one of the major surfaces of said semiconductor comprising the steps of:

covering said metallization with a layer of second conducting material which is different from said first conducting material and which is oxidizable in an electrolytic system wherein the electrolyte comprises a material selected from the group consisting of $H_2O$ adjusted to a pH in the range 1–5 or 9–13, $H_2O$ in a pH range 5–9 including a material for supplying ions to add conductivity, and an $H_2O_2$ solution;

making the structure the anode in said electrolytic system; and passing a current through said system of sufficient magnitude such that only a portion of the thickness of said layer of second conducting material is oxidized while a native oxide grows into the exposed surface of the semiconductor, such that said oxide formed on the second conducting material is sufficiently thick to insulate said first conducting material from the electrolyte and sufficiently thin to be penetrated for contacting said first conducting material.

2. The method according to claim 1 wherein said layer of second conducting material is formed over substantially the entire surface of said semiconductor including said metallization of the first conducting material.

3. The method according to claim 1 wherein said layer of second conducting material is formed selectively over said metallization of the first conducting material leaving exposed the portions of the surface including said metallization of the first conducting material which are not covered by said metallization.

4. The method according to claim 1 wherein the second conducting material comprises a metal selected from the group consisting of Al, Ta, Ti, Ni and Zn or alloys including such metals.

5. The method according to claim 1 wherein the thickness of the layer of second conducting material is at least 1,750 A.

6. The method according to claim 1 wherein the thickness of the layer of second conducting material is within the range 2,000–7,000 A.

7. The method according to claim 1 wherein the semiconductor is selected from the group consisting of GaP, GaAs, GaAlAs, GaAlP, GaAsP, InGaAs and InGaP.

8. A method of forming an oxide on the surface of a III—V compound semiconductor including contact metallization of a first metal on one of the major surfaces of said semiconductor comprising the steps of:

covering said metallization with a layer of second metal which is different from said first metal, said second metal being selected from the group consisting of Al, Ni, Ti, Ta and Zn or alloys including such metals;

making the structure the anode in an electrolytic system wherein the electrolyte comprises a material selected from the group consisting of $H_2O$ adjusted to a pH in the range 1–5 or 9–13, $H_2O$ in a pH range 5–9 including a material for supplying ions to add conductivity and an $H_2O_2$ solution; and passing a current through said system of sufficient magnitude such that only a portion of the thickness of said second metal layer is oxidized while a native oxide grows into the exposed surface of the semiconductor such that said oxide formed on the second metal is sufficiently thick to insulate said first metal from the electrolyte and sufficiently thin to be penetrated for contacting said first metal.

9. The method according to claim 8 wherein said second metal layer is formed over substantially the entire surface of said semiconductor including said metallization of the first metal.

10. The method according to claim 8 wherein said second metal layer is formed selectively over said metallization of the first metal leaving exposed the portions of the surface including said metallization of the first metal which are not covered by said metallization.

11. The method according to claim 8 wherein the thickness of the second metal layer is at least 2,000 A.

12. The method according to claim 1 further comprising the step of cracking the oxide formed on said second conducting material to permit electrical contact to said first conducting material.

* * * * *